United States Patent [19]

Stenabaugh

[11] 4,436,692

[45] Mar. 13, 1984

[54] PLUG FOR REACTOR PRESSURE VESSEL NOZZLE

[75] Inventor: Donald D. Stenabaugh, Danbury, Conn.

[73] Assignee: Automation Industries, Inc., Greenwich, Conn.

[21] Appl. No.: 347,509

[22] Filed: Feb. 10, 1982

[51] Int. Cl.³ ............................................. G21C 19/04
[52] U.S. Cl. ..................................... 376/204; 376/260
[58] Field of Search ................ 376/203, 204, 260, 281

[56] References Cited

U.S. PATENT DOCUMENTS

| | | | |
|---|---|---|---|
| 3,282,793 | 11/1966 | Jamrog | 376/263 |
| 3,713,969 | 1/1973 | Cahill, Jr. | 376/281 |
| 4,035,232 | 7/1977 | Kube | 376/203 |
| 4,066,498 | 1/1978 | Hoffmann et al. | 376/281 |
| 4,077,837 | 3/1978 | Schabert et al. | 376/281 |
| 4,100,019 | 7/1978 | Groff et al. | 376/204 |

FOREIGN PATENT DOCUMENTS 1485611  5/1966  France .................. 376/203

*Primary Examiner*—Sal Cangialosi
*Attorney, Agent, or Firm*—Francis N. Carten

[57] ABSTRACT

There are disclosed method and apparatus for plugging the underwater recirculating nozzle of a boiling water reactor vessel. The method includes the lowering of a plug by a secondary cable into the annular space between the vessel sidewall and the nuclear fuel shroud. The cable is displaced outwardly, permitting the plug to enter the space between the sidewall and the jet pumps. Cable and plug are then shifted laterally into position over the nozzle, the weight of the plug being taken by a primary cable which lowers the plug into position. A special apparatus is provided which rests upon the core shroud and performs the steps of displacing and laterally shifting the cable.

13 Claims, 14 Drawing Figures

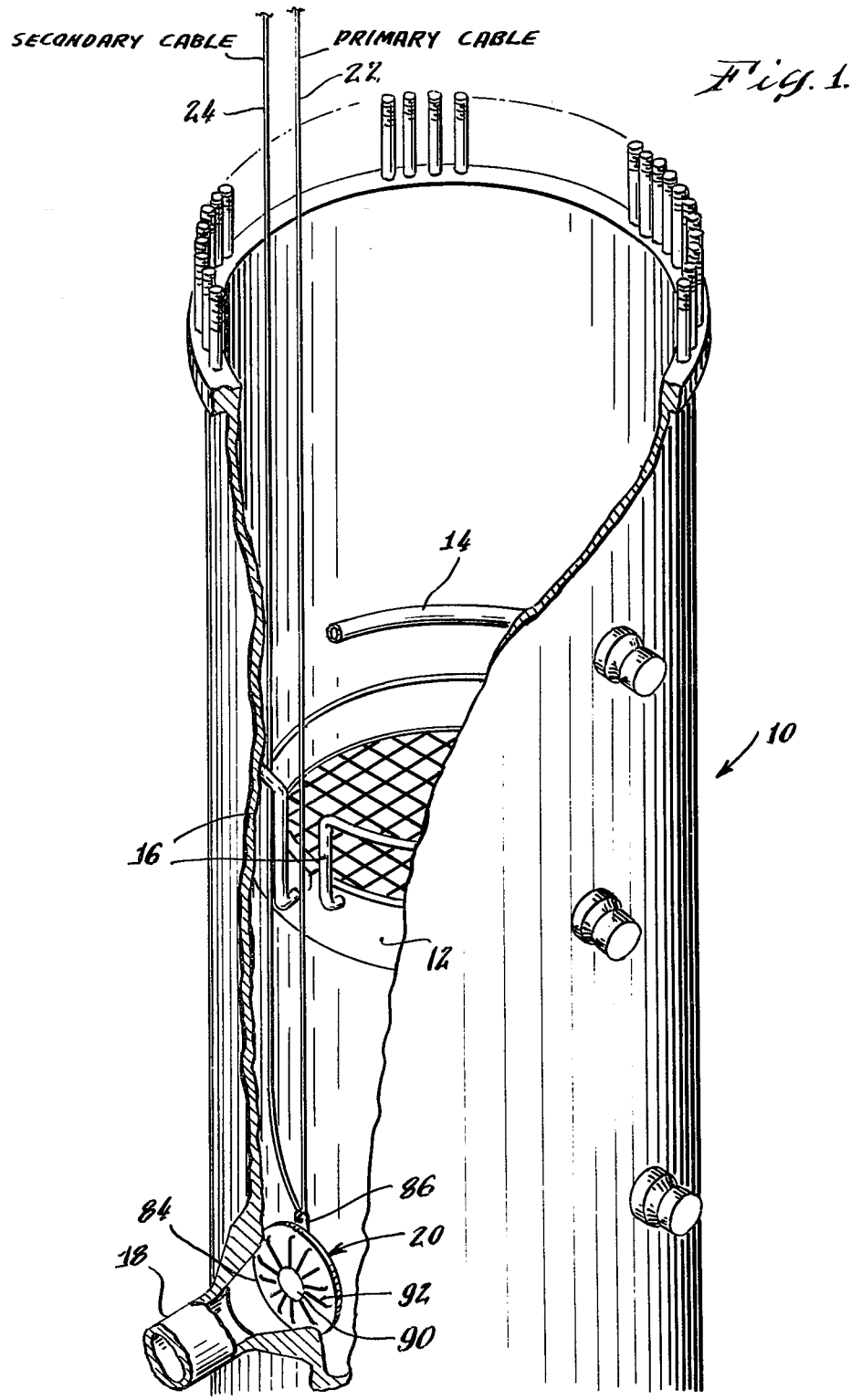

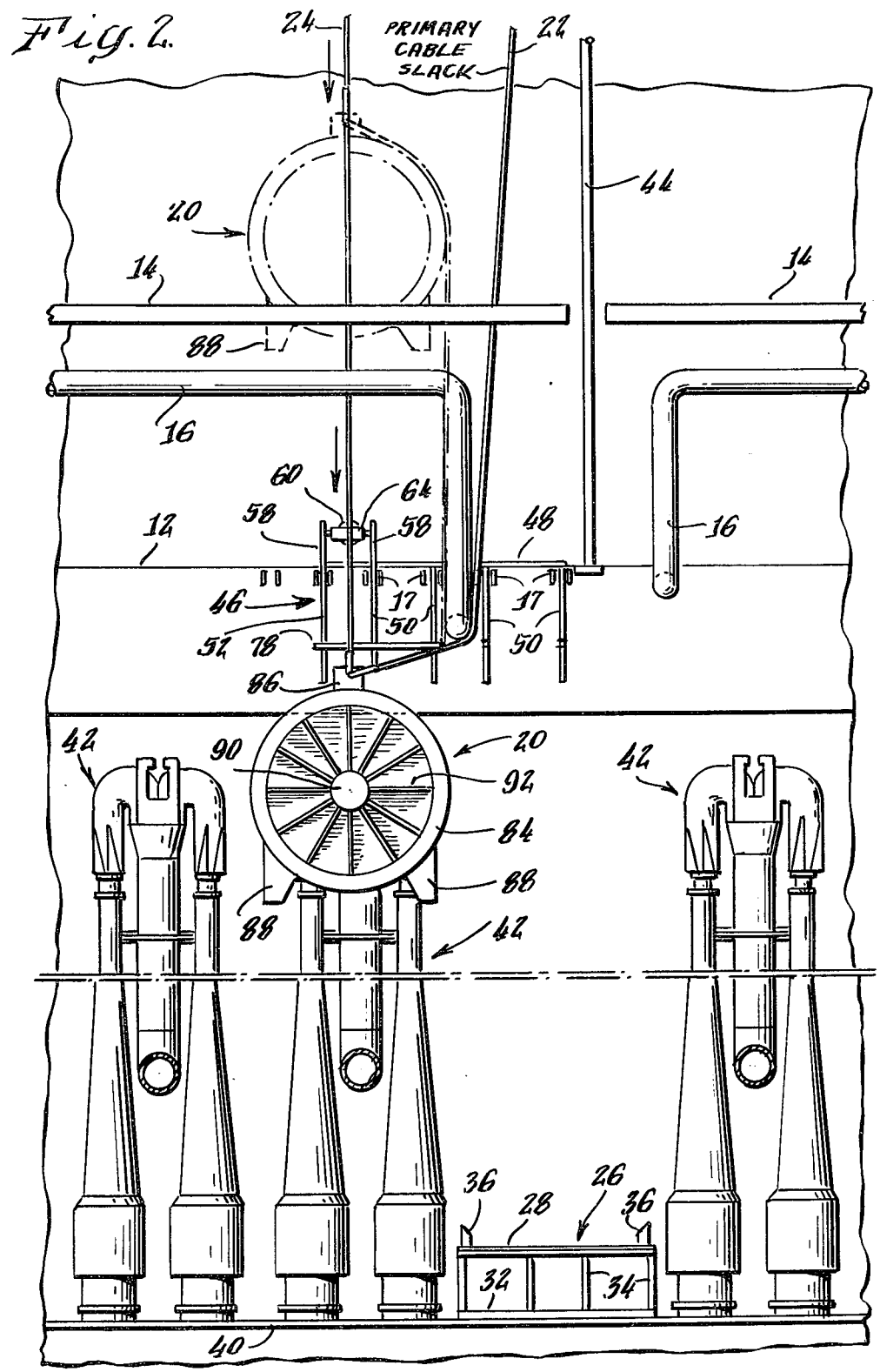

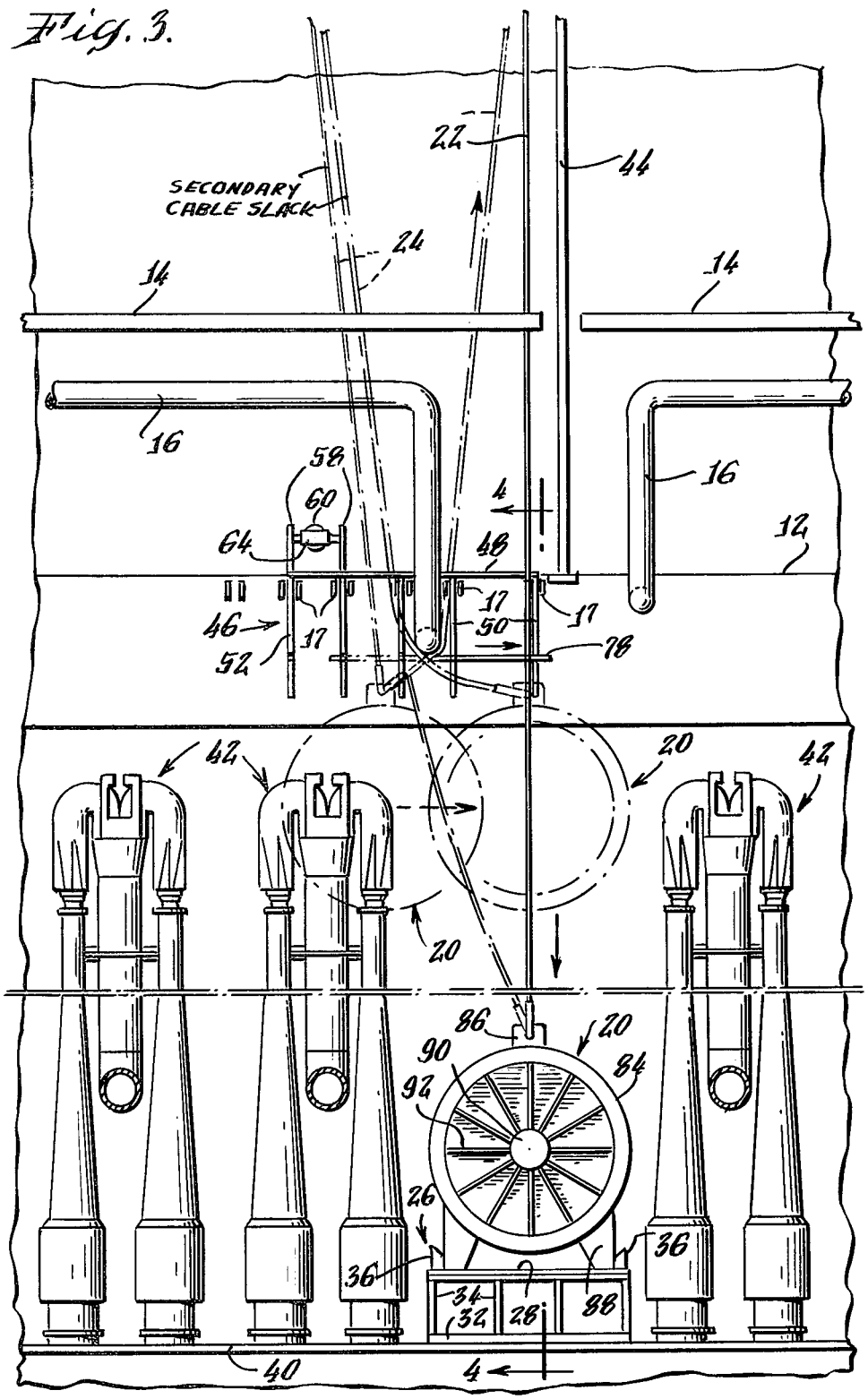

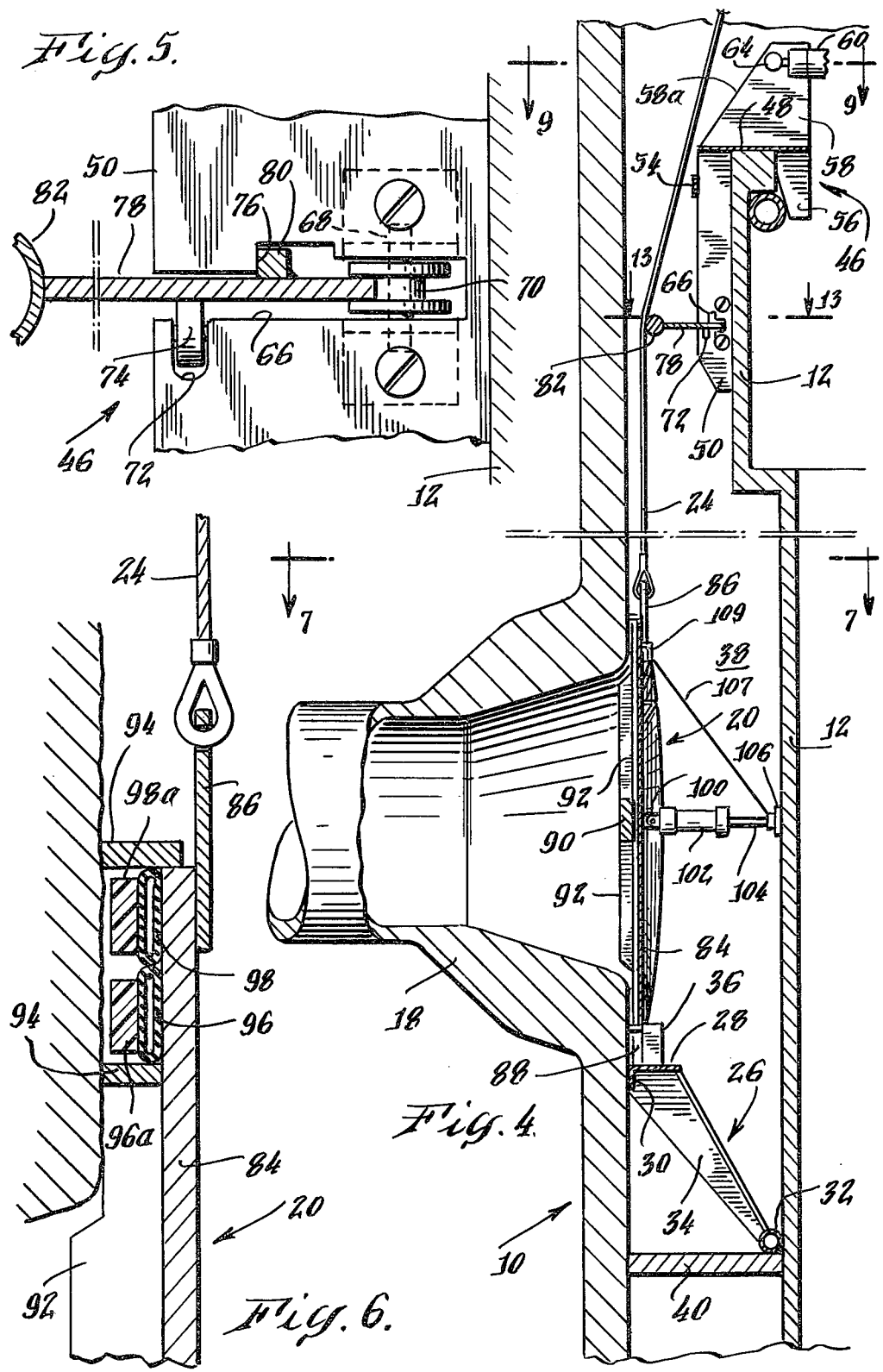

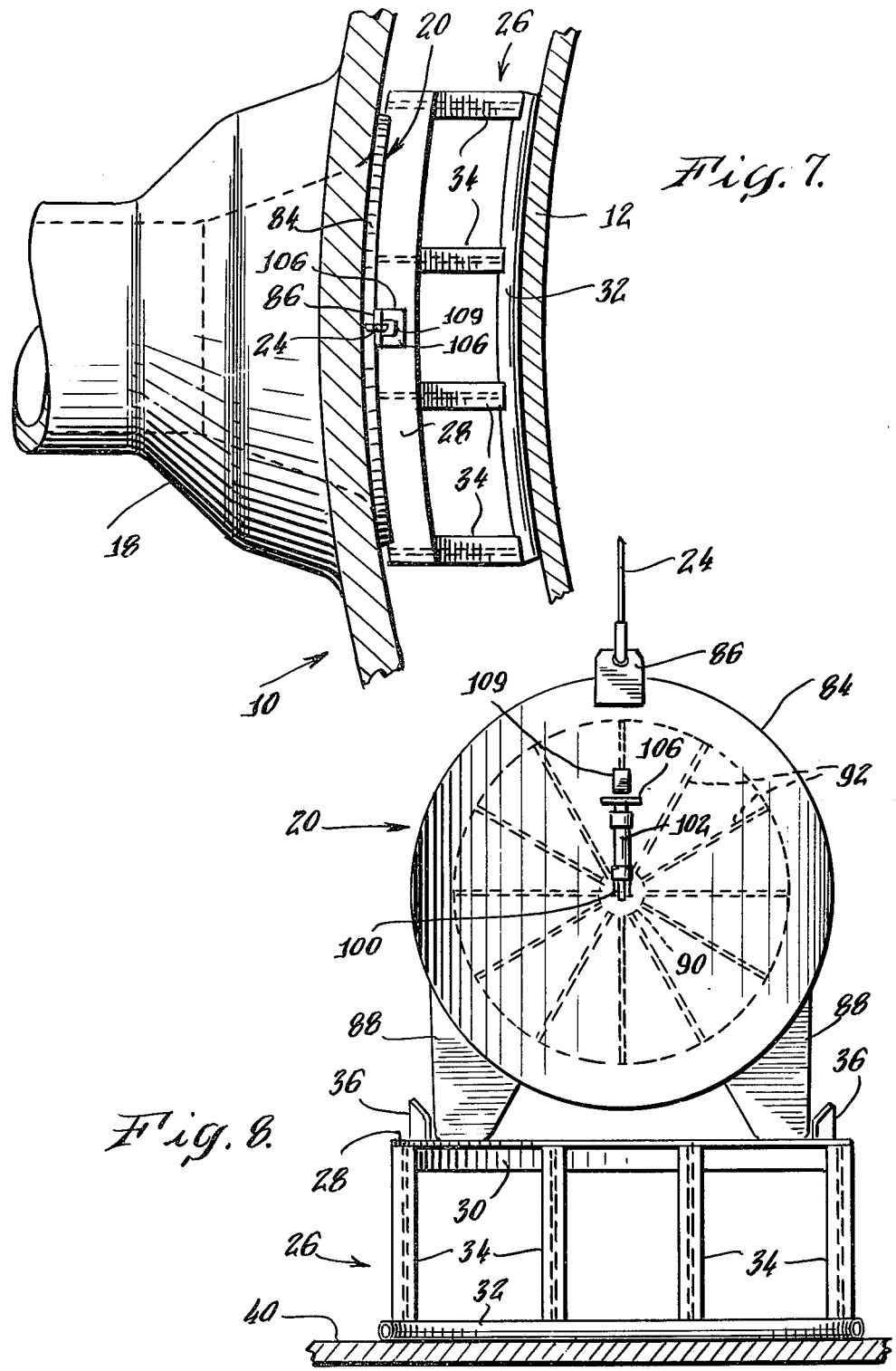

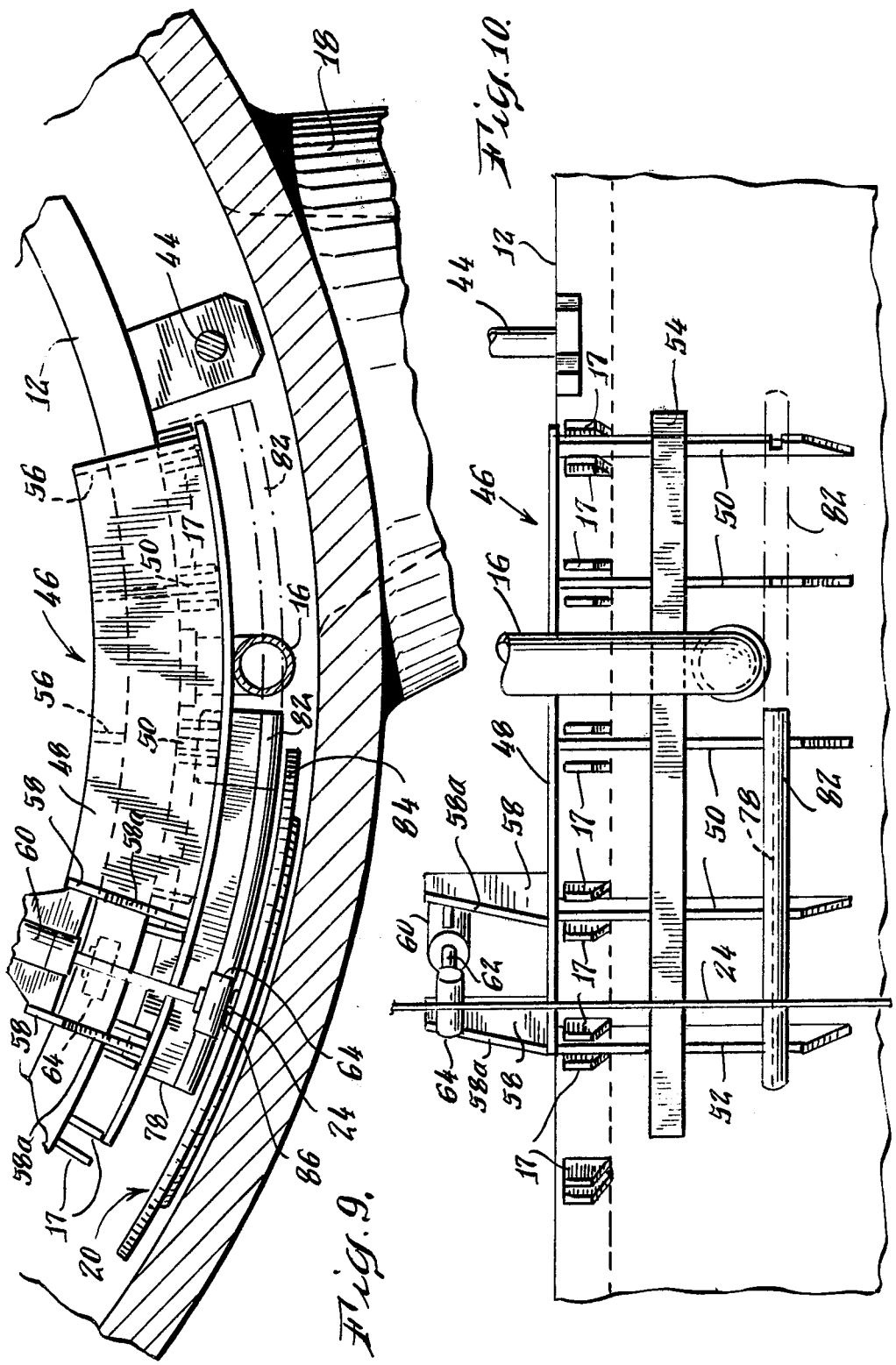

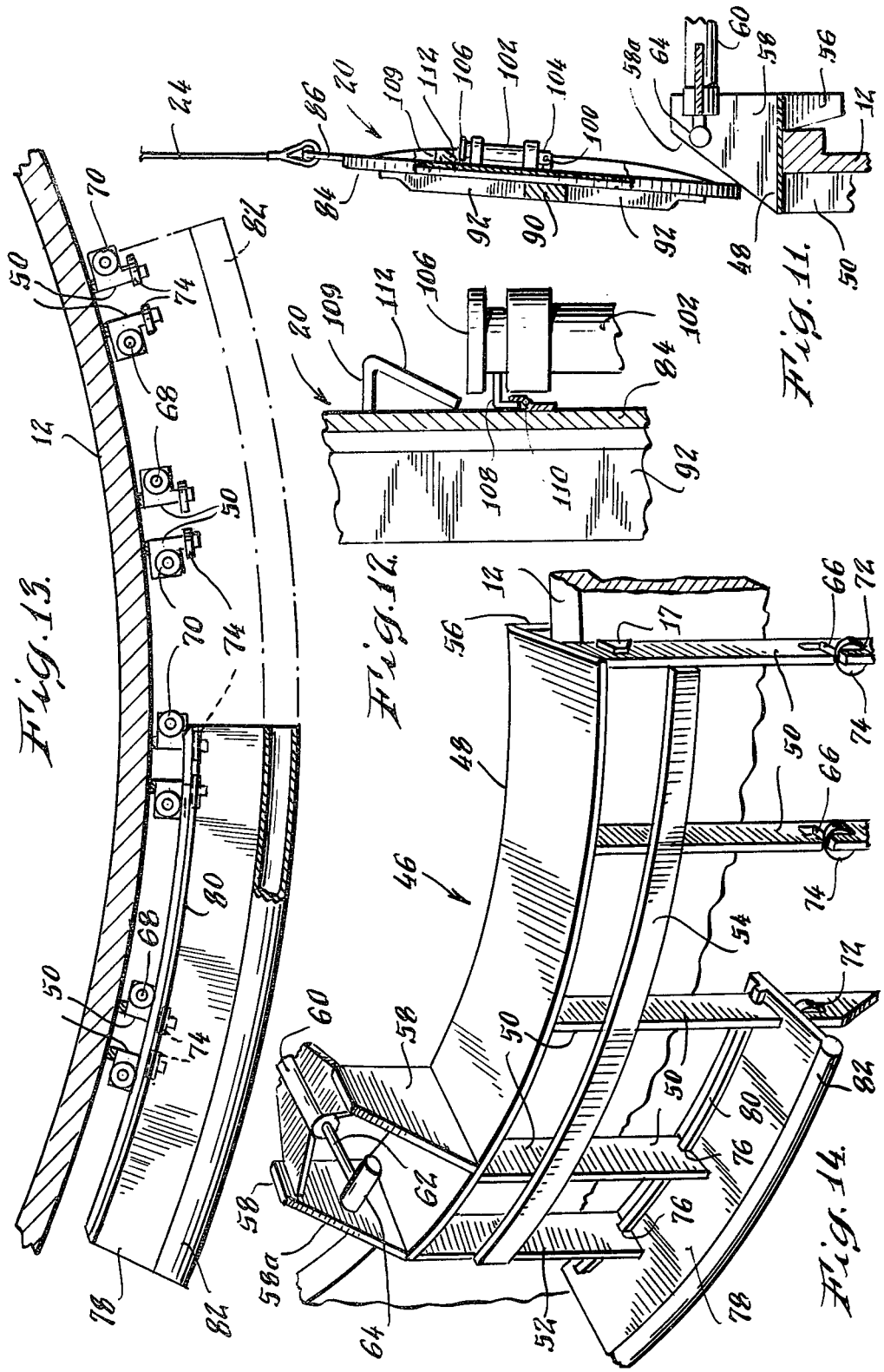

PLUG FOR REACTOR PRESSURE VESSEL NOZZLE

TECHNICAL FIELD

This invention relates to the nuclear reactor field. More particularly, it pertains to method and apparatus for plugging a relatively large underwater nozzle in the sidewall of a reactor pressure vessel.

BACKGROUND ART

A boiling water reactor vessel is constructed in such a manner that it has a relatively large underwater nozzle extending through its sidewall which is used to recirculate—conventionally, for example, 28" in diameter. Quite often the piping and valving associated with the line leaving this nozzle require servicing, or even replacement. When such service is required, it would be desirable to be able to perform it without having to drain the reactor pressure vessel. In this manner, the necessity for removing the reactor fuel to a storage pool could be avoided. A smaller sized nozzle can often be plugged by means of a "freeze seal". This is a technique wherein liquid nitrogen is circulated around the nozzle to freeze the water within to effectuate a seal. However, the usual recirculating nozzle is too large to employ such a technique.

In the past, it has been possible to plug the recirculation nozzle of a boiling water reactor vessel by lowering into the vessel a disk shaped plug which is curved to fit against the vessel sidewall and includes a relatively deep, conical extension which serves to position the plug in the nozzle opening. A hydraulic cylinder on the rear of the plug pushes against the core shroud to seat the plug in the nozzle opening. A circular pneumatic sealing member on the edge of the plug disk is then inflated to seal off the plug.

The foregoing technique has been successfully applied in older-type reactor vessels. However, the plug which is used in that technique is relatively thick, approximately 6 ½ inches. Nevertheless, it could be lowered straight down in the annular space between the core shroud and the reactor wall. In the newer reactors, however, there have been added a number of elements which form obstructions, thereby preventing the relatively thick prior art plugs from being employed. The primary obstructions are jet pumps which are positioned in the space between the reactor wall and the core shroud. Prior art plugs are too thick to pass between the jet pumps and the sidewall. Even if they could, they would be prevented from doing so because of intervening plumbing, such as core spray inlet pipes and feedwater spargers, and also by the reactor pressure vessel guide rod.

Accordingly, it is a primary object of the present invention to provide improved method and apparatus for plugging the recirculation nozzle of a water-filled boiling water reactor pressure vessel. Other objects, features, and advantages will be apparent from the following description and appended claims.

DISCLOSURE OF INVENTION

There is disclosed herein a method of plugging an underwater nozzle in the sidewall of a cylindrical nuclear reactor pressure vessel which contains a core shroud radially displaced from the sidewall to form an annular space. The annular space contains jet pumps which are spaced from the sidewall. In accordance with the method, a substantially disk shaped plug is provided which has a diameter sufficient to cover the nozzle opening. The plug is curved to match the curve of the reactor sidewall. Means are provided on one surface of the plug for sealing against the sidewall around the nozzle opening. Cylinder/piston means are carried by the other side of the plug. The plug is lowered by means of a first cable into the annular space above the jet pumps. The cable is then pushed toward the sidewall until the plug is vertically aligned with the space between the sidewall and the jet pumps. The plug is lowered on the first cable until it enters the space between the sidewall and the jet pumps. The plug is then laterally shifted into vertical alignment with the nozzle to be plugged and the weight of the plug is simultaneously shifted to a second cable. The plug is then lowered by the second cable into alignment with the nozzle opening. The cylinder/piston means is then actuated to force the plug away from the core shroud and into sealing engagement over the nozzle opening.

BRIEF DESCRIPTION OF DRAWINGS

FIG. 1 is a perspective view, partially cut away, of a boiling water reactor vessel with its recirculating nozzle plugged in accordance with the invention;

FIG. 2 is an elevational view illustrating the plug of the invention partially lowered in place;

FIG. 3 is a view similar to FIG. 2 illustrating the plug in position over the nozzle opening;

FIG. 4 is an enlarged cross-section taken substantially along the line 4—4 of FIG. 3;

FIG. 5 is an enlarged elevational view in partial cross-section of a transfer tool employed with the present invention;

FIG. 6 is an enlarged cross-section illustrating the pneumatic seal on the sealing disk of the invention;

FIG. 7 is a cross-section taken substantially along the line 7—7 of FIG. 4;

FIG. 8 is a rear view of the plug of the invention positioned within the reactor vessel;

FIG. 9 is an enlarged cross-section taken substantially along the line 9—9 of FIG. 4, showing a top view of the transfer tool;

FIG. 10 is a front view of the transfer tool of FIG. 9;

FIG. 11 is an elevational view showing the manner in which the plug is lowered over the transfer tool;

FIG. 12 is an enlarged detail of the pneumatic cylinder latch and release mechanism on the rear of the plug disk;

FIG. 13 is an enlarged cross-section taken substantially along the line 13—13 of FIG. 4; and FIG. 14 is a perspective view of the transfer tool of the present invention.

BEST MODE FOR CARRYING OUT THE INVENTION

Illustrated in FIG. 1 is a boiling water reactor vessel 10 with its top and internal hardware removed above the level of the core shroud 12. Above the core shroud 12 is the feedwater sparger 14 and the conventional core spray inlet pipes 16. Around the periphery of core shroud 12 are pairs of steam separator holddown lugs 17(FIG. 2). Although not illustrated, the vessel 10 contains water to a level above the core shroud 12 which contains the nuclear fuel elements. The reactor vessel 10 includes the usual recirculating nozzle 18. In the FIG. 1 illustration, the nozzle 18 is closed by the plug 20 which, in turn, is connected to a primary 22 and a secondary 24 cable. When so positioned, plug 20 makes a watertight seal with nozzle 18, permitting the nozzle and any associated piping to be serviced. The manner in which this is achieved is described below.

Before the plug is lowered into the reactor pressure vessel 10, a support structure 26 is lowered into position directly beneath the recirculating nozzle 18. The technique for lowering support structure 26 is essentially the same as that employed for lowering the plug and will be described in connection with the description of the plug placement.

The construction of the support structure will be best seen in FIGS. 4, 7, and 8. It comprises a narrow arcuate top plate 28 having a narrow, downwardly extending flange 30. The top plate and flange are connected to a tubular footer 32 by means of four tapered stringers 34, each of which is of T-shaped cross-section. A pair of end stops 36 extend upwardly from either end of the top plate 28.

As is illustrated in FIG. 4, the support structure 26 is designed, and its weight is so distributed, that when lowered into the annular space 38 between the wall of the reactor vessel 10 and core shroud 12, it will rest with the footer 32 in the angle between the core shroud 12 and the jet pump support plate 40. In this position, it will tend to fall forward against the inner surface of the reactor vessel wall into a highly stable position directly below the recirculating nozzle 18 opening.

As previously explained, the newer boiling water reactor vessels include jet pumps 42, as illustrated in FIGS. 2 and 3, positioned within the annular space 38 between the reactor vessel wall and the core shroud 12. The space between the jet pumps 42 and the reactor vessel wall is thus much less than was available prior to the installation of the pumps. For this reason, it is necessary to use a much thinner plug which is also more difficult to lower into place while avoiding obstacles such as the core spray inlet pipes 16 and the RPV guide rod 44.

Before either the support structure 26 or the plug 20 are lowered into the pressure vessel, a specialized installation tool 46 is lowered into position atop the core shroud 12 as shown in FIGS. 2 and 3. The construction of installation tool 46 is shown most clearly in FIGS. 5, 9, 10, 12, and 13. It comprises a flat arcuate baseplate 48 which is adapted to rest upon the top of the core shroud 12. The baseplate 48 is retained in position by means of a plurality of elongated support ribs 50, which extend downwardly from the baseplate 48 along the outer surface of the core shroud 12 and are equally spaced to extend between respective pairs of the steam separator holddown lugs 17 on the shroud. A somewhat closer spaced support rib 52 extends downwardly from the left end of the baseplate 48 as viewed in FIG. 14. The ribs 50, 52 are further interconnected by means of a reinforcing bar 54. A plurality of shorter support ribs 56 extend downwardly from the baseplate 48 around the inner circumference of the core shroud 12 as will be seen most clearly in FIG. 4.

A pair of spaced uprights 58 at the left end of the baseplate 48, as viewed in FIGS. 10 and 14, support a hydraulic cylinder 60 from which extends a piston rod 62 which terminates in a transfer T-bar 64. Each of the support ribs 50, 52 defines a slot 66 therethrough as shown in detail in FIG. 5. Near the rear of the slot there is mounted, on a vertical axial pin 68, a horizontal flanged roller 70. Toward the front of slot 66, there is provided a recess 72 within which is mounted a transversely, rotatable, vertical roller 74. Intermediate the rollers 70, 74, the top of the slot is inletted so as to form a vertical shoulder 76.

A flat, horizontal, arcuate slide plate 78 is carried within the slots 66 of the elongated support ribs 50, 52. Its length is such as to span approximately three of the elongated support ribs 50. As will be clear from FIG. 5, it rests upon the respective rollers 74 and its rear edge engages and rolls against the flanged roller 70. It is retained in position by means of a keeper bar 80 secured to its top surface which engages the shoulders 76. The outermost edge of the slide plate 78 carries a tubular engagement member 82. It will thus be seen that the slide plate 78 with the engagement member 82 is circumferentially slidable within the elongaged support ribs 50, 52 around the outer circumference of the core shroud 12 as shown, for example, by the dashed-dotted lines in FIG. 10.

The nozzle plug which is employed in this invention is shown most clearly in FIGS. 4, 6, 8 and 11. Its main body is a disk plate 84 which is curved to match the curve of the wall of the reactor vessel 10. On its top edge, it carries a cable lug 86 and from its lower quadrant depend a pair of spaced support legs 88. The outer surface of plug 20 (as referenced to the core shroud) defines a central hub 90 and a plurality of radial stiffening ribs 92. The outer ends of the ribs 92 terminate at a pair of spaced, circumferential rings 94 as shown in FIG. 6 which define a channel containing a pair of flattened, annular, pneumatic tubes 96, 98 upon each of which is mounted an elastomeric sealing ring 96a, 98a.

On the reverse side of plug 20, opposite the hub 90, there is provided a pivot 100 to which is loosely mounted a hydraulic cylinder 102. Cylinder 102 includes a piston 104 having a head 106. Piston head 106 carries a hook 108, as illustrated in FIG. 12, which engages a cooperating latch 110 mounted on the plug 20. A retraction line 107 is connected to the piston head and passes through a guide 109 on the plug. When the piston is retracted, the cylinder 102 is thus retained in an upright folded position against the plug 20. In line with the piston head 106 but slightly displaced therefrom is a ramp 112, also carried by plug 20 as shown in FIG. 12.

In contrast to the prior art recirculating nozzle plugs which were approximately 6 ½" thick, the illustrated plug is approximately 2 ½" thick and is thereby capable of being lowered into position and clearing obstructions when following the method of this invention.

OPERATION

The first step in plugging the recirculation nozzle is to lower the installation tool 46 into position on the top of the core shroud 12. (Slide plate 78 must be to the left, as viewed in FIG. 2, at the beginning of this maneuver.) This involves an essentially vertical drop, substantially free of obstructions, and may be accomplished by cables monitored by closed circuit television.

After the installation tool has been positioned, the support structure 26 must be lowered into the position illustrated in FIGS. 3 and 4. This is a more complex maneuver as it requires a lateral shift past the obstructions created by the core spray inlet pipe 16 and the jet pumps 42. It is accomplished by use of primary and secondary cables. The technique employed is substantially identical to that employed in positioning the plug 20 itself. Accordingly, it will not be separately described.

When it is desired to lower the plug 20 into position to block recirculating nozzle 18, the primary cable 22 is first threaded beneath the core spray inlet pipe 16. It is then connected to the cable lug 86 on the plug 20 which is suspended upon the secondary cable 24 as illustrated by the dash-dotted lines of FIG. 2. Plug 20 is then lowered on the secondary cable 24 with the primary cable 22 remaining slack. During this time, the slide plate 78 of the installation tool 46 is slid to the right as viewed in FIG. 2 so that it is out of the way of the descending plug 20.

When the lower edge of plug 20 engages the camming surfaces 58a on the uprights 58 of the installation tool, it is guided outwardly as illustrated in FIG. 11 so as to enter the annular space between the core shroud 12 and the wall of the reactor vessel 10. As soon as the lug 86 has dropped below the T-bar 64 of the cylinder 60 on the installation tool 46, downward movement is halted, and cylinder 60 is actuated. Piston rod 62 is forced out so that the T-bar 64 engages the cable 24 forcing both it and the suspended plug 20 outwardly and in alignment with the space between the jet pump 42 and the reactor vessel wall. The plug 20 is then lowered until the lug 86 is below the slide plate 78, downward movement is halted again. At this time, the slide plate 78 of the installation tool is slid to the left (by cable or other remote manipulators) on the respective rollers 70, 74 and into the position illustrated in FIGS. 2 and 13 wherein the engagement member 82 is positioned behind the cable 24. The T-bar 64 is then retracted by the cylinder 60 leaving the cable 24 in engagement with member 82 as illustrated at the top of FIG. 4.

Next, plug 20 is shifted laterally by exerting a pull on primary cable 22 while slackening tension on secondary cable 24. As a result, the plug 20 and the slide plate 78 are both shifted to the right, as illustrated in FIG. 3, until the entire weight of the plug 20 is supported by primary cable 22 and secondary cable 24 is slack. At this point, plug 20 is positioned directly above the recirculation nozzle opening and the support structure 26.

Plug 20 is then lowered on the primary suoport cable 22 until its support legs 88 engage the top of the support structure 26 between the end stops 36. As the weight of the plug 20 is gradually transferred to the support structure 26, the latter is caused to be seated firmly in position as illustrated in FIG. 4 to positively establish the plug 20 over the recirculating nozzle opening.

While plug 20 is maintained in an upright position by cable 24, the cylinder 102 on the back of the plug is actuated to force piston 104 slightly outwardly. By reference to FIG. 12 it will be apparent that, as the cylinder is actuated and the head 106 moves out, the hook 108 will become disengaged from the latch 110. As the head 106 moves out slightly further, it rides up on the ramp 112 and the entire cylinder piston assembly is rotated clockwise. It thereupon falls into a horizontal position under the force of gravity and continued extension causes the head 106 to engage the core shroud 12 as illustrated in FIG. 4. The pressure in cylinder 102 is increased to the point where the piston presses against the core shroud 12 with a force of approximately 5000 pounds. Thereafter, one of the pneumatic tubes 96, 98, which encircles the circumference of the plug 20, is inflated and its corresponding sealing ring 96a, 98a engages the reactor vessel walls surrounding the recirculating nozzle. The tube is inflated until the force it exerts against the vessel wall just begins to equalize that exerted against the shroud by the cylinder 102. At that point, the lines leaving the recirculation nozzle 18 may be drained. Thereafter, the hydrostatic pressure of the water remaining in the reactor vessel serves to retain the plug in a sealed position. Normally, only one of the pneumatic tubes 96, 98 is employed, the other serving as a back up.

When it is desired to remove plug 20, the pneumatic tubes 96, 98 are deflated, the piston 104 is retracted away from core shroud 12, and the cylinder/piston assembly is retracted against plug 20 by retraction line 107. The piston is then drawn further into cylinder 102 until hook 108 engages latch 110. The plug 20 is then lifted by primary cable 22, transversely shifted, and removed by secondary cable 24 in a reversal of the installation sequence steps. Thereafter, support structure 26 is removed in similar fashion, and installation tool 46 is lifted from the vessel.

It will be apparent that a number of elements have been omitted from the foregoing description and accompanying drawings for the sake of simplification. These would include, for example, a number of hydraulic and pneumatic lines, hydraulic and pneumatic fittings and controls, and various cables. However their uses will be apparent to those skilled in the art. It will also be apparent that a number of variations and modifications may be made in the invention without departing from its spirit and scope. Accordingly, the foregoing description is to be construed as illustrative only, rather than limiting. This invention is limited only by the scope of the following claims.

What is claimed is:

1. The method of plugging an underwater nozzle opening in a vertical sidewall of a cylindrical nuclear reactor vessel containing a core shroud radially displaced from said sidewall to form an annular space, said annular space containing jet pumps therein spaced from said sidewall, which comprises:
   providing a substantially disk shaped plug having a diameter sufficient to cover said nozzle opening and curved to match the curve of said sidewall, means on one surface of said plug for sealing against said sidewall around said nozzle opening, and cylinder/piston means carried by the other side of said plug;
   lowering said plug as it hangs vertically from a first cable into said annular space above said jet pumps and laterally displaced from vertical alignment with said nozzle;
   pushing said cable toward said sidewall until said plug is vertically aligned with the space between said sidewall and said jet pumps;
   lowering said plug on said first cable into the space between said sidewall and said jet pumps;
   laterally shifting said plug into vertical alignment with said nozzle while shifting the weight of said plug to a second cable;
   lowering said plug on said second cable into alignment with said nozzle opening; and
   actuating said cylinder/piston means to force said plug away from said core shroud and into sealing engagement over said nozzle opening.

2. The method of claim 1 wherein said plug sealing means are expanded to enhance said sealing engagement.

3. For use in a substantially cylindrical nuclear reactor pressure vessel having a substantially cylindrical fuel core shroud therein spaced from the vessel vertical sidewall wherein an underwater opening in said sidewall is to be, sealed by a plug lowered by a first as it hangs vertically therefrom into the space between said sidewall and shroud, laterally shifted into vertical alignment with said opening, and lowered by a second cable into proximity with said opening, apparatus which comprises:

a base member engageable with the top of said core shroud;

first support means extending upwardly from said base member;

means carried by said first support means for radially outwardly displacing said first cable relative to said core shroud;

second support means depending downwardly from said base member along the external surface of said core shroud; and cable translating means carried by said second support means for receiving said first cable upon release by said displacing means and being circumferentially shiftable relative to said core shroud.

4. The apparatus of claim 3 wherein said first cable displacing means comprises a cylinder and piston.

5. The apparatus of claim 4 wherein said first support means comprises:

a pair of spaced upright members, said cylinder being supported therebetween.

6. The apparatus of claim 5 wherein said upright members include camming surfaces positioned to guide said plug when lowered by said first cable into the space between said sidewall and core shroud.

7. The apparatus of claim 3 wherein said second support means include guide means engageable with said cable translating means.

8. The apparatus of claim 7 wherein said guide means comprise a plurality of aligned rollers.

9. The apparatus of claim 8 wherein said second support means comprise:

a plurality of spaced ribs defining circumferentially aligned slots containing said rollers therein.

10. The apparatus of claim 9 wherein said cable translating means comprises an elongated slide member engageable with said cable and circumferentially movable along said rollers.

11. The apparatus of claim 10 wherein said first cable displacing means comprises a cylinder and piston.

12. The apparatus of claim 11 wherein said first support means comprises:

a pair of spaced upright members, said cylinder being supported therebetween.

13. The apparatus of claim 12 wherein said upright members include camming surfaces positioned to guide said plug when lowered by said first cable into the space between said sidewall and core shroud.

* * * * *